(12) United States Patent
Chen et al.

(10) Patent No.: US 6,630,809 B2
(45) Date of Patent: Oct. 7, 2003

(54) SYSTEM AND METHOD FOR INDUCTION MOTOR CONTROL

(75) Inventors: Li Chen, Livonia, MI (US); Xingyi Xu, Canton, MI (US); Vinod Reddy, Ocala, FL (US); Richard Joseph Hampo, Plymouth, MI (US); Kerry Eden Grand, Chesterfield, MI (US)

(73) Assignee: Ballard Power Systems Corporation, Dearborn, MI (US)

( * ) Notice: Subject to any disclaimer, the term of this patent is extended or adjusted under 35 U.S.C. 154(b) by 0 days.

(21) Appl. No.: 09/683,180

(22) Filed: Nov. 29, 2001

(65) Prior Publication Data

US 2003/0098665 A1 May 29, 2003

(51) Int. Cl.[7] ................................................ H02P 7/64
(52) U.S. Cl. ........................ 318/804; 318/800; 318/801
(58) Field of Search ................................ 318/727, 767, 318/798, 799, 800, 804, 801

(56) References Cited

U.S. PATENT DOCUMENTS

| | | | | |
|---|---|---|---|---|
| 4,926,105 A | * | 5/1990 | Mischenko et al. | 318/800 |
| 5,365,158 A | * | 11/1994 | Tanaka et al. | 318/806 |
| 5,446,363 A | * | 8/1995 | Kurosawa et al. | 318/806 |
| 5,459,386 A | * | 10/1995 | Okachi et al. | 318/727 |
| 5,796,236 A | * | 8/1998 | Royak | 318/804 |
| 6,327,524 B1 | * | 12/2001 | Chen | 318/825 X |
| 6,335,605 B1 | * | 1/2002 | Negoro | 318/727 |

* cited by examiner

Primary Examiner—Bentsu Ro
(74) Attorney, Agent, or Firm—Seed IP Law Group PLLC

(57) ABSTRACT

Field oriented induction motor system including a field oriented induction motor having an associated torque current and an associated flux current and a predetermined current ratio, wherein the predetermined current ratio is defined as the ratio of the torque current to the flux current, and wherein the predetermined current ratio is dependent upon the saturation state of the motor. A method for selecting the ratio of torque current to flux current for a field oriented induction motor including applying an allocation factor to the torque current and flux current, wherein the allocation factor is dependent upon the saturation state of the motor. The saturation state of the motor is determined based upon motor parameters.

27 Claims, 6 Drawing Sheets

Basic scheme of FOC for AC-motor

SYSTEM AND METHOD FOR INDUCTION MOTOR CONTROL

BACKGROUND OF INVENTION

The present invention relates generally to systems and methods for increasing the efficiency of a field oriented induction motor of a given design and, more specifically, to systems and methods for selecting the associated torque current and flux current such that the motor may operate at a peak torque per amp (PTPA) point.

The "fuel" powering a field oriented induction motor is current. This current may be divided into two components, torque current and flux current. The torque current may be viewed as that component of the current which generates motive force, or torque. The flux current may be viewed as that component of the current which generates magnetic flux in the rotor. Shaft torque and rotor flux are related, with shaft torque proportional to the product of rotor flux times torque current.

The torque current and flux current associated with a field oriented induction motor may be continually adjusted during motor operation. Relative to the present invention, the ratio between the torque current and flux current is also of importance in motor design. Motors of the same design, incorporating, for example, the same amount of magnetizable and conductive material, and the same lamination characteristics, typically have the same ratio. The ratio between the torque current and flux current has significant implications for motor efficiency.

Typically, it is assumed that all motor parameters are constant across a given operating range, and mathematical models predict that for optimum efficiency the torque current and flux current should be made equal. Alternatively, a predetermined ratio may be assumed to exist between the torque current and flux current. This ratio may be an approximation based upon experimentation, for example. These assumptions and approximations are limited, however, by the fact that for a field oriented induction motor there is ultimately a maximum flux which may be achieved. This is due to what is known in the art as the "saturation effect." At some point, increasing the flux current to a field orientation induction motor results in only a marginal increase in flux. This diminishing return is a result of the physical characteristics, and limitations, of the materials which make up the motor. Due to the saturation effect, it is desirable, once saturation has occurred, to divert current to produce torque, rather than flux. Thus, due to the saturation effect, the traditional assumptions and approximations, such as those discussed above, often lead to undesirable inefficiencies.

SUMMARY OF INVENTION

The present invention overcomes the problems discussed above and provides systems and methods for increasing the efficiency of a field oriented induction motor. Specifically, the present invention provides systems and methods which allow the current used by a field orientation induction motor to be minimized, while the torque produced by the motor is maximized, allowing the motor to operate at the peak torque per amp (PTPA) point. This is accomplished by providing a motor designer with the tools necessary to determine the optimum ratio between torque current and flux current.

In one embodiment, a field oriented induction motor system includes a field oriented induction motor having an associated torque current and an associated flux current and a predetermined current ratio, wherein the predetermined current ratio is defined as the ratio of the torque current to the flux current, and wherein the predetermined current ratio is dependent upon the saturation state of the motor.

In another embodiment, a method for selecting the ratio of torque current to flux current for a field oriented induction motor includes applying an allocation factor to the torque current and flux current, wherein the allocation factor is dependent upon the saturation state of the motor.

DETAILED DESCRIPTION

The following detailed description describes what is known in the art as a torque current, designated as $I_{qs}$, and a flux current, designated as $I_{ds}$. Those skilled in the art will appreciate that the terms "torque current" and "flux current," as used herein, are well-known and understood in the art. However, as a courtesy to the reader, following are introduced the theory and concepts underlying the terms "torque current," and "flux current," as used herein.

Figures 3A, 3B, 3C:
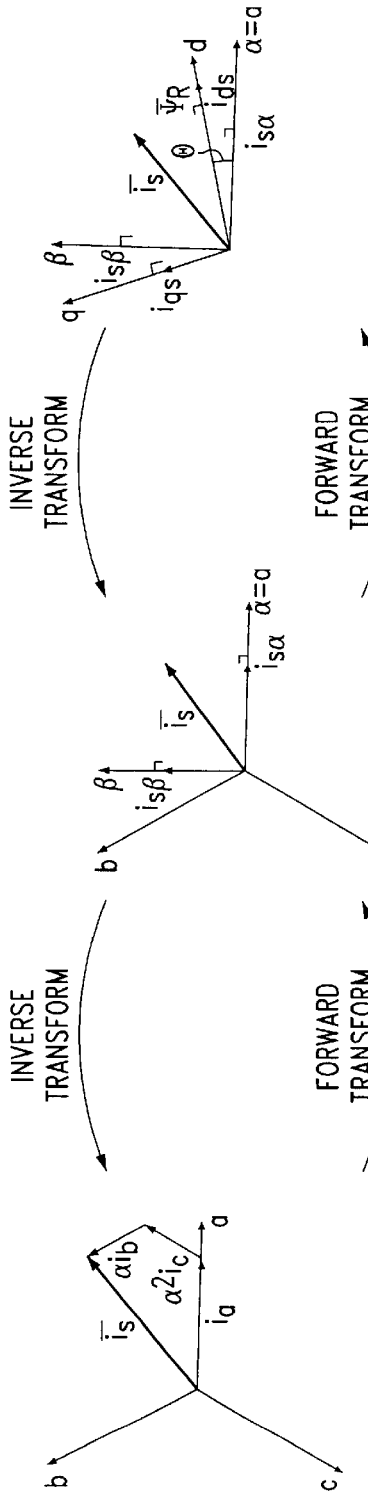
FIG. 3A shows three-phase current directional vectors a, b, and c, in complex (i.e., real-imaginary) space, upon which may be projected three current vectors having magnitudes of $i_a$, $i_b$, and $i_c$ respectively oriented in the directions of directional vectors a, b, and c.
FIG. 3B depicts the definition of an orthogonal coordinate system, having α and β axes, where the α axis coincides with the direction of the current $i_a$.
FIG. 3C illustrates an orthogonal coordinate system, having d and q axes ("d" stands for the "direct" flux direction of the stator; "q" stands for a direction in "quadrature" to the direct flux direction, "d," of the stator).

With reference to the figures, and with reference now to FIGS. 3A–3C, shown are three graphs introducing the theory and concepts underlying the terms "torque current," and "flux current," as used herein. Those skilled in the art will appreciate that three-phase induction motors are generally driven by three sinusoidal electrical current waveforms, where each of the sinusoidal electrical current waveforms has the same frequency but is displaced 120 degrees relative to the other waveforms. Those skilled in the art will appreciate that it is common to use what are known in the art as "phasor transforms" to convert each of the three-phase sinusoidal currents to three separate complex space "vectors," each of which is displaced from the other by 120 degrees, and where, since each of the vectors is rotating at an angular frequency of ωt (omega t), the three vectors are depicted as stationary relative to each other. Thereafter, vector-based techniques are used for computation involving the currents. Subsequently, the inverse phasor transform (typically taking the real part of the resultant complex "vector" expression) is used to transform the vector-based manipulation back into the time domain. See Nilsson, *Electrical Circuits*, pages 282–452 (1983).

Relatively recently, with respect to AC motor control, an extremely powerful adaptation of and improvement upon the phasor transform method has been used to provide for somewhat independent control of the rotating magnetic fields in the stator and the torque developed by induction motors. See Texas Instruments, *Field Oriented Control of 3-Phase AC-Motors* (1998); see also Texas Instruments, *Implementing a Universal Control System for Field-Oriented Control of AC Machines Using the TMS320C14 DSP* (1996). Those skilled in the art will recognize that induction motors are relatively interesting machines, in that the three-phase electrical current is used to generate a rotating magnetic field in the stator (stationary member) of the motor. Those skilled in the art will appreciate that as this rotating magnetic field of the stator sweeps across the conductors of the rotor (rotating member), a current is induced in the conductors of the rotor. Those skilled in the art will further recognize that as this current flows in the presence of the rotating field of the stator, the rotating field of the stator will exert a force on the rotor conductor wherein the current has been induced. It is this force on the conductor carrying the induced current that creates the torque of the motor. Department of the Navy, *Alternating Current Motors in Basic Electricity* pages 317–326 ($2^{nd}$ ed. 1970).

Those skilled in the art will appreciate that insofar as the torque of an induction motor is dependent upon the current induced in the rotor by the rotating magnetic field in the stator, and the rotating magnetic field in the stator is dependent upon and controlled by the 3-phase currents in the windings of the stator, historically it has been virtually impossible to separate control of the rotating magnetic field in the stator from control of the torque developed by the engine. However, the aforementioned relatively recent adaptation of and improvement upon the phasor transform method does provide somewhat independent control of the rotating magnetic fields in the stator and the torque developed by the motor in a fashion which will now be described.

Referring now to FIG. 3A, shown are three-phase current directional vectors a, b, and c, in complex (i.e., real-imaginary) space, upon which may be projected three current vectors having magnitudes of $i_a$, $i_b$, and $i_c$ respectively oriented in the directions of directional vectors a, b, and c (those skilled in the art will appreciate that vectors can be specified by magnitude and direction). Depicted is that vector addition techniques are used to produce a resultant stator current vector, Is. See Texas Instruments, *Field Oriented Control of 3-Phase AC-Motors* page 3 (1998). It will be understood by those having ordinary skill in the art that the current vectors exist relative to a complex (i.e., real-imaginary) two-dimensional space, which is not shown explicitly in order to avoid confusion in the following description of vector transformations.

With reference now to FIG. 3B, depicted is the definition of an orthogonal coordinate system, having α and β axes, where the α axis coincides with the direction of the current $i_a$. Illustrated is that the projections of the resultant stator current vector, Is, are calculated via use of what is known to those having ordinary skill as the Clarke transformation. At this point we have a two-dimensional representation of the resultant stator current vector, Is, in α and β, where α and β are synchronous with the rotating magnetic field produced in the stator (remember that although the phasors $i_a$, $i_b$, and $i_c$ are depicted as stationary, relative to each other, in actuality they are all rotating at the same angular frequency). However, as noted, the point of the relatively recent adaptation of and improvement upon the phasor transform method is to independently control the rotating magnetic field of the stator independent of the torque of the motor. It has been verified empirically that such control can be achieved by a vector-space transform based upon the phase difference, θ, between the $i_a$ direction and the direction of the rotor flux induced by rotating magnetic field of within the stator. See Texas Instruments, *Field Oriented Control of 3-Phase AC-Motors* page 4 (1998), and see also Texas Instruments, *Implementing a Universal Control System for Field-Oriented Control of AC Machines Using the TMS320C14 DSP* pages 10–11 (1996).

Referring now to FIG. 3C, illustrated is an orthogonal coordinate system, having d and q axes ("d" stands for the "direct" flux direction of the stator; "q" stands for a direction in "quadrature" to the direct flux direction, "d," of the stator). Illustrated is that the projections of the resultant stator current vector, Is, in d-q space are calculated via use of what is known to those having ordinary skill as the Park transformation. The projection of Is on the direct axis is denoted as $I_{ds}$. The projection of Is on the quadrature (q) axis is denoted as $1_{qs}$. See Texas Instruments, *Field Oriented Control of 3-Phase AC-Motors* page 4 (1998).

The mathematical manipulations described in relation to FIGS. 3A–3C have turned out to have real-world utility. It has been empirically verified that the rotating magnetic field in the stator is proportional to $I_{ds}$. It has also been empirically verified that $I_{qs}$ is proportional to the torque of developed by a motor. This empirical verification, in conjunction with the rise of fast Digital Signal Processors (DSPs), has given rise to the ability to somewhat independently control the flux and torque of induction motors. See Texas Instruments, *Field Oriented Control of 3-Phase AC-Motors* page 6 (1998).

Figure 4:
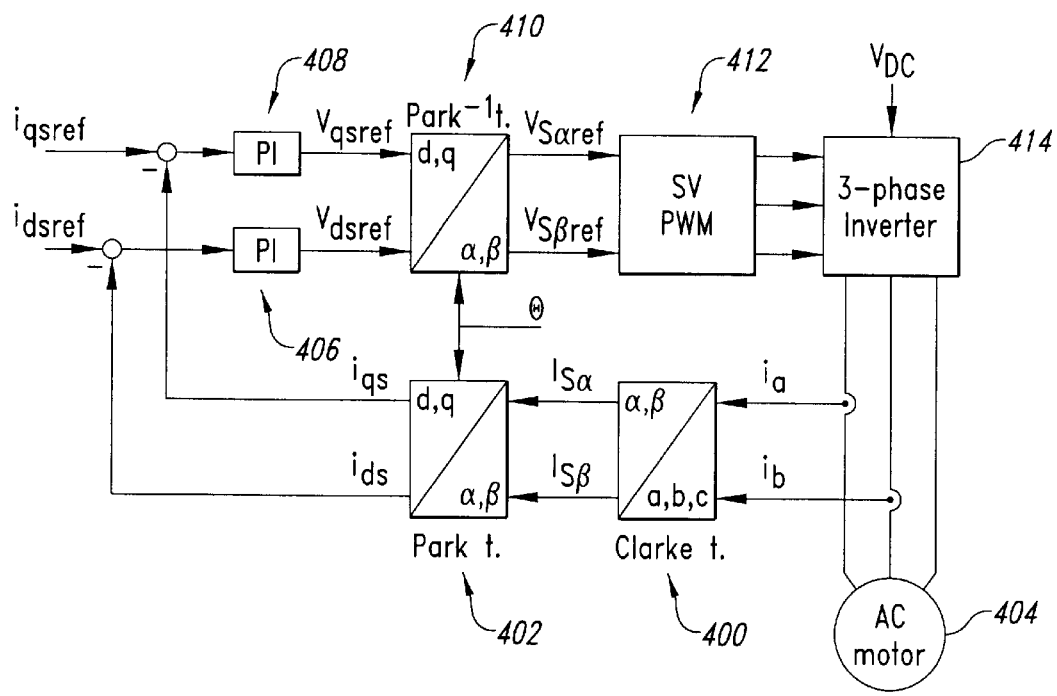
FIG. 4 shows a high-level block diagram of a prior-art field oriented control scheme for control of an induction motor.

With reference now to FIG. 4, shown is a high-level block diagram of a prior-art field oriented control scheme for control of an induction motor. Illustrated is that the Clarke transformation unit 400, in conjunction with the Park transformation unit 402, transforms the three-phase power supplied to induction motor 404 into $I_{ds}$ and $I_{qs}$. Thereafter, shown is that negative feedback control is used to ensure that $I_{ds}$ and $I_{qs}$ respectively track reference values $I_{dsref}$ and $I_{qsref}$. Depicted is that, in response to the respective differences between $I_{ds}$, $I_{qs}$ and their respective reference values $I_{dsref}$, $I_{qsref}$, proportional-integral controllers 406, 408 respectively inform inverse Park transformation unit 410 of how much $I_{ds}$ and $I_{qs}$ need to be adjusted to track their target reference values $I_{dsref}$ and $I_{qsref}$. Thereafter, inverse Park transformation unit 410, in conjunction with inverse Clarke transformation-pulse width modulation controller unit 412, controls 3-phase inverter 414 (which creates 3-phase power from its $V_{DC}$ input) in the fashion such that $I_{ds}$ and $I_{qs}$ will approach their respective target values $I_{dsref}$ and $I_{qsref}$. See Texas Instruments, *Field Oriented Control of 3-Phase AC-Motors* page 6 (1998), and see also Texas Instruments, *Implementing a Universal Control System for Field-Oriented Control of AC Machines Using the TMS320C14 DSP* pages 10–11 (1996).

The present invention provides systems and methods for selecting a ratio between torque current and flux current, such that the efficiency of a field oriented induction motor is maximized and the motor is allowed to function at a peak torque per amp (PTPA) point. For example, for a given torque current, the systems and methods of the present invention allow the optimal flux current to be determined, taking into account the saturation effect.

It is understood by those skilled in the art that the torque for a field orientation control (FOC) inverter, is described by the following equation:

$$T_e = \frac{3P}{2}\frac{L_m}{L_r}\lambda_{dr}i_{qs}, \quad (1)$$

where $T_e$ is the torque, P is the number of pole pairs of the motor, $\lambda_{dr}$ is the direct-axis component of the rotor flux, and $i_{qs}$ is the quadrature-axis component of the stator current, or the torque current. $L_m$ and $L_r$ are the mutual, or magnetizing, inductance and the total rotor inductance (the mutual inductance plus the rotor leakage inductance), respectively, for the motor. Since the mutual inductance may be approximated as being equal to the total rotor inductance, $$L_m \approx L_r, \quad (2)$$

the torque for the field orientation control (FOC) inverter becomes:

$$T_e = \frac{3P}{2}\lambda_{dr}i_{qs}. \quad (3)$$

Simplifying further:

$$\lambda_{dr} = L_m i_{ds}, \quad (4)$$

where $i_{ds}$ is the direct-axis component of the stator current, or the flux current. Thus, the torque for the field orientation control (FOC) inverter becomes:

$$T_e = \frac{3P}{2}L_m i_{ds} i_{qs}. \quad (5)$$

For a given constant motor current $I_s$:

$$I_s^2 = i_{ds}^2 + i_{qs}^2, \quad (6)$$

and if motor parameters are assumed to be constant, then for a maximum value of torque $T_e$:

$$i_{ds} = i_{qs}. \quad (7)$$

If the mutual inductance $L_m$ is saturated, the equation discussed above does not hold, and the relation between the torque current and flux current becomes:

$$K i_{ds} = i_{qs}, K \geq 1. \quad (8)$$

Further, $$KL_{mSaturated} = L_{mNonSaturated}, \quad (9)$$

so, $$K = \frac{L_{mNonSaturated}}{L_{mSaturated}}. \quad (10)$$

Therefore, $$i_{ds} = \frac{1}{K}i_{qs}. \quad (11)$$

This equation agrees with experimental data for peak torque per amp (PTPA) operation. Thus, the present invention provides a relationship for parsing the system current between the torque current $i_{qs}$ and the flux current $i_{ds}$ which is applicable based upon and irrespective of the saturation effect or level within the motor.

Figure 1:
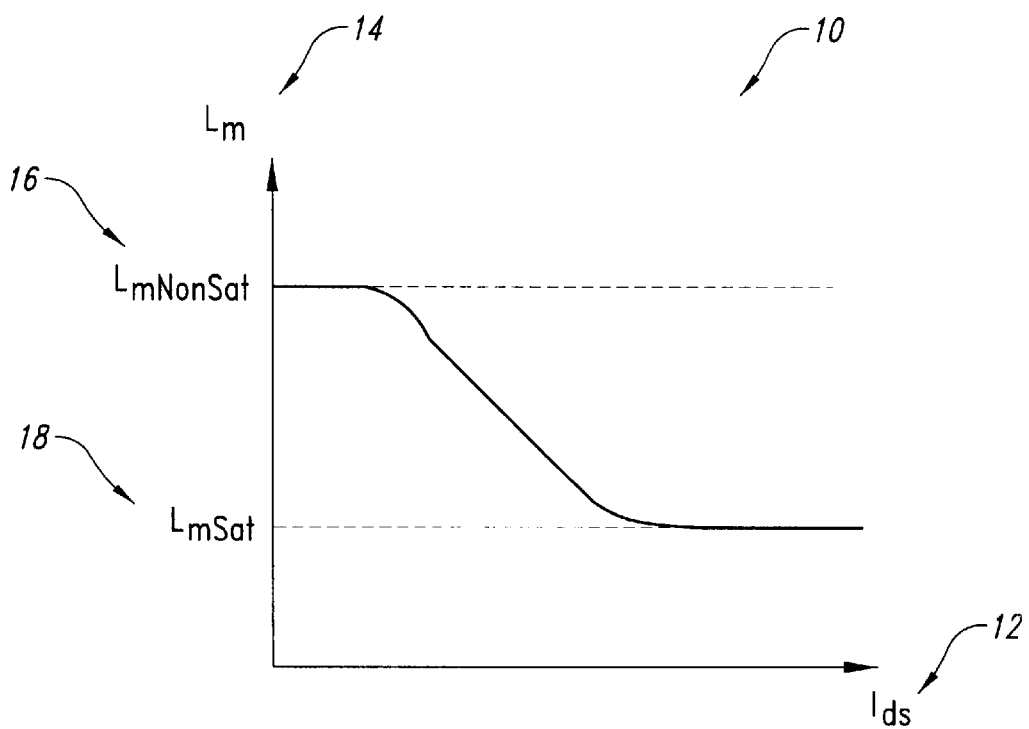
FIG. 1 is a graph of the relationship between flux current, $I_{ds}$, and mutual, or magnetizing, inductance, $L_m$.

FIG. 1 is a graph 10 of the relationship between flux current ($I_{ds}$) 12 and mutual, or magnetizing inductance ($L_m$) 14. The graph 10 illustrates that $L_{mNonSaturated}$ 16 is typically greater than $L_{mSaturated}$ 18 once a saturation level has been reached, and that the mutual inductance 14 decreases with increasing flux current 12. Utilizing the equation (11) above, and the methods of the present invention, the torque current $i_{qs}$ may be adjusted such that it is greater than the flux current $i_{ds}$ at saturation.

Figure 5:
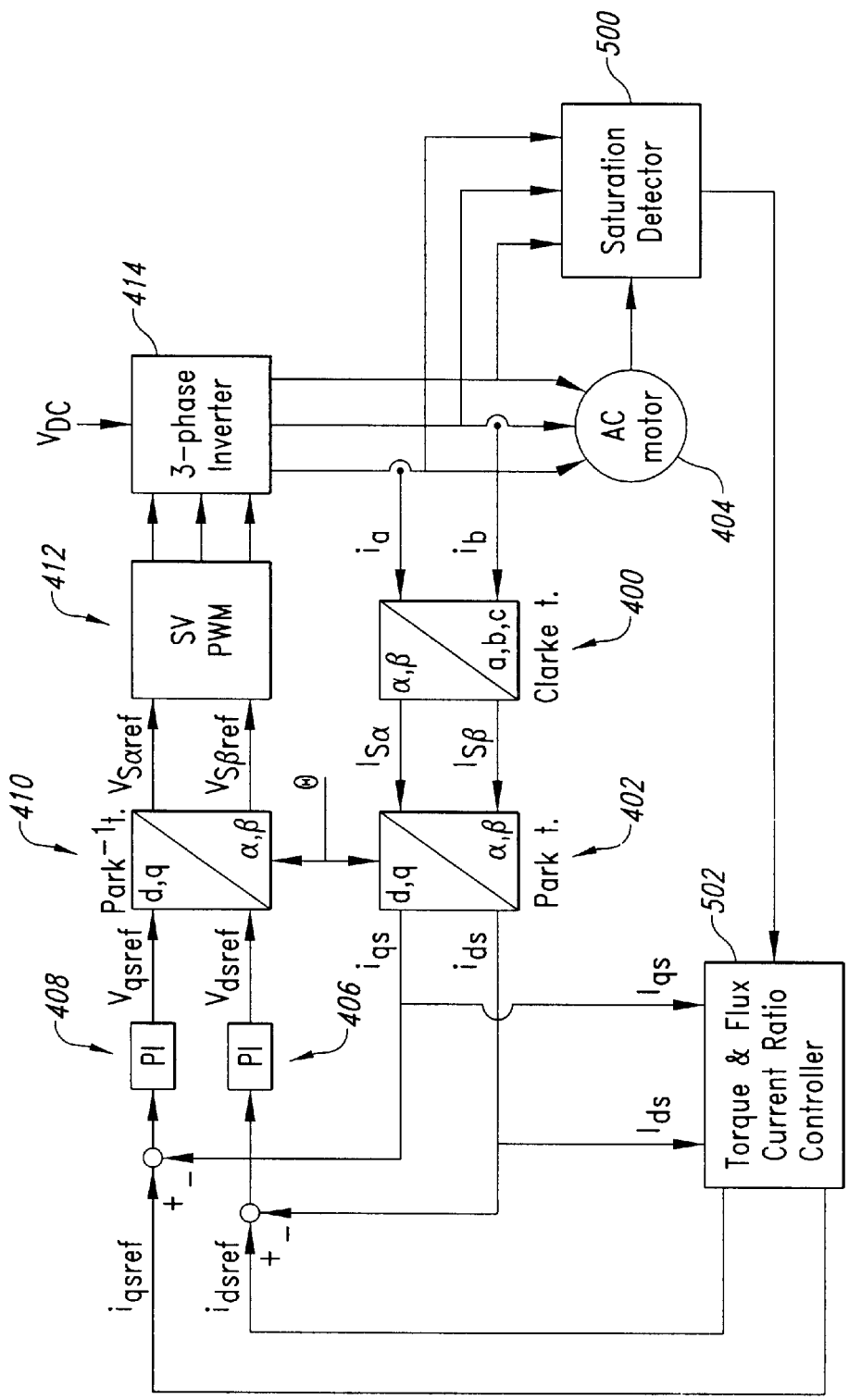
FIG. 5 shows the high-level block diagram of the prior-art field oriented control scheme for control of an AC motor, modified in light of the foregoing discussion.

With reference now to FIG. 5, shown is the high-level block diagram of the prior-art field oriented control scheme for control of an AC motor, modified in light of the foregoing discussion. As noted above, $I_{ds}$ and $I_{qs}$ are to be held to be relatively the same if induction motor 404 is NOT in saturation, and $I_{qs}$ is to be adjusted to be relatively equal to $KI_{ds}$ when the induction motor is in saturation. Accordingly, illustrated is that saturation unit 500 is connected to induction motor 404 and the three-phase power lines feeding induction motor 404 in order to monitor one or more engine parameters which those skilled in the art will recognize are indicative of the motor entering saturation (e.g., as stated above, parameters such as no attendant increase in coil voltage in response to an increased difference in current over time as a result of a limit reached on induction).

As noted above, $I_{ds}$ and $I_{qs}$ are to be held to be relatively the same if induction motor 404 is NOT in saturation, and $I_{qs}$ is to be adjusted to be relatively equal to $KI_{ds}$ when induction motor 404 is in saturation. Accordingly, shown is that torque-flux current ratio controller 502 receives as inputs $I_{ds}$, $I_{qs}$, and the output of saturation detector 500. Depicted is that torque-flux current ratio controller 502 transmits as outputs $I_{dsref}$ and $I_{qsref}$. In accordance with the teachings set forth above, $I_{dsref}$ will be set to equal $I_{qsref}$ when the saturation detector 500 indicates the induction motor 404 is NOT in saturation, and $I_{qsref}$ will be set to be relatively equal to $KI_{dsref}$ when the saturation detector 500 indicates the induction motor 404 is in saturation. The depicted feedback control components shown will then work to force $I_{ds}$, and $I_{qs}$ to track their reference values.

Figure 6:
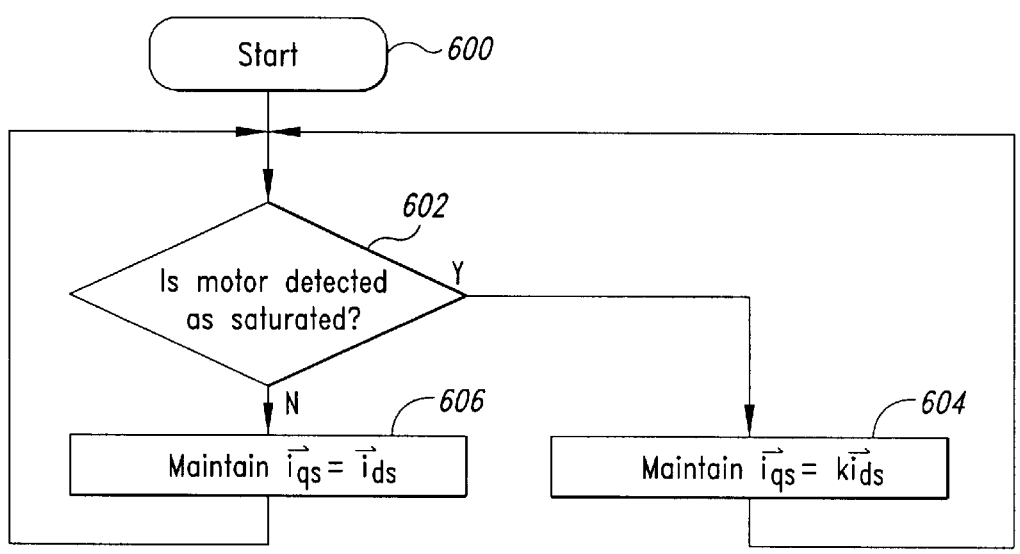
FIG. 6 depicts a high-level logic flowchart illustrating a process in accord with the teachings set forth above.

Referring now to FIG. 6, depicted is a high-level logic flowchart illustrating a process in accord with the teachings set forth above. Method step 600 shows the start of the process. Method step 602 depicts an inquiry as to whether a motor is detected as saturated (e.g., induction motor 404) (e.g., via saturation detector 500). In the event that the motor is detected as saturated, the process continues to method step 604 wherein $I_{qs}$ is adjusted to be relatively equal to $KI_{ds}$ (e.g., via the torque-flux current ratio controller 502 setting $I_{qsref}$ to be relatively equal to $KI_{dsref}$). In the event that the motor is detected as NOT saturated, the process continues to method step 606 wherein $I_{qs}$ is adjusted to be relatively equal to $I_{ds}$ (e.g., via the torque-flux current ratio controller 502 setting $I_{qsref}$ to be relatively equal to $I_{dsref}$).

Figure 2:
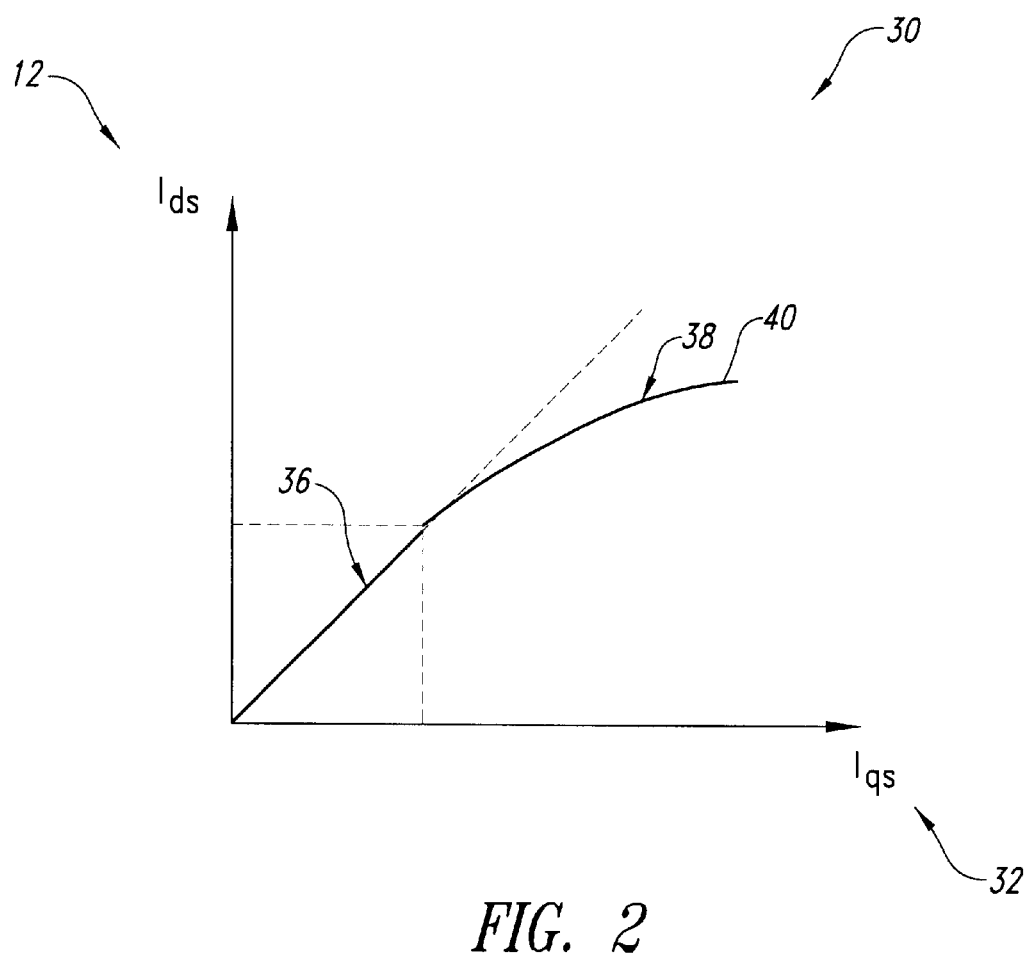
FIG. 2 is a graph of the relationship between torque current, $I_{qs}$, and flux current, $I_{ds}$, demonstrating the saturation effect and the optimization methods of the present invention.

FIG. 2 is a graph 30 of the relationship between torque current $I_{qs}$ and flux current $I_{ds}$ 12. The graph 30 illustrates that, utilizing equation (11) above, and the methods of the present invention, it may be assumed that the torque current $I_{qs}$ 32 is equal to the flux current $I_{qs}$ 12 for the portion 36 of the curve 40 where K=1, i.e. when $L_{mNonSaturated}$ is equal to $L_{mSaturated}$, prior to saturation. Following saturation, $I_{qs}$ 32 may be adjusted such that it is relatively greater than $I_{ds}$ 112. This may be done according to the portion 38 of the curve 40 where K>1, i.e. when $L_{mNonsaturated}$ is greater than $L_{mSaturated}$. The points along the curve 40 represent the peak torque per amp (PTPA) points of the system. Thus, for example, the curve 40 may be used to select a flux current $I_{ds}$ 12 for a given torque current $I_{qs}$ 32 such that the maximum motor efficiency is achieved during the design process.

The present invention has been described with reference to examples and preferred embodiments. Other examples and embodiments may achieve the same results. Variations in and modifications to the present invention will be apparent to those skilled in the art and the following claims are intended to cover all such equivalents.

What is claimed is:

1. A field oriented induction motor system, comprising:
   a field oriented induction motor having an associated torque current and an associated flux current; and
   a torque-flux current ratio controller that substantially maintains a ratio of torque current to flux current by use of a first relationship when the induction motor is in a substantially nonsaturated state, and by use of a second relationship when the induction motor is in a substantially saturated state.

2. The field oriented induction motor system of claim 1, wherein the first relationship comprises:
   a relationship between the torque current and flux current defined by the equation $i_{qs}=i_{ds}$.

3. The field oriented induction motor system of claim 1, wherein the second relationship comprises:
   a relationship between the torque current and flux current defined by the equation $i_{qs}=K\, i_{ds}$, where K is a variable having a value greater than 1.

4. A field oriented induction motor having an associated torque current and an associated flux current, the field oriented induction motor comprising:
   a torque-flux current ratio controller that provides a predetermined current ratio, wherein the predetermined current ratio is defined as the ratio of the torque current to the flux current; and wherein the predetermined current ratio is dependent upon the saturation state of the motor such that
   (a) the motor has a first predetermined current ratio when the motor is in a nonsaturated state, and
   (b) the motor has a second predetermined current ratio when the motor is in at least a partially saturated state.

5. The field oriented induction motor of claim 4, wherein the first predetermined current ratio is 1:1, and wherein the current ratio is expressed as:

$$\frac{i_{qs}}{i_{ds}} = 1.$$

6. The field oriented induction motor of claim 4, wherein the second predetermined current ratio is determined according to the equation:

$$\frac{i_{qs}}{i_{ds}} = K,$$

where K is a variable having a value greater than 1.

7. The field oriented induction motor of claim 6, wherein K is dependent upon the mutual, or magnetizing, inductance of the motor.

8. The field oriented induction motor of claim 6, wherein K is expressed as:

$$K = \frac{L_{mNonSaturated}}{L_{mSaturated}}.$$

9. The field oriented induction motor of claim 4, wherein the saturation state of the motor is determined based upon motor parameters.

10. A method for selecting the ratio of torque current to flux current for a field oriented induction motor, the method comprising applying an allocation factor to the torque current and flux current, wherein the allocation factor is dependent upon the saturation state of the motor, such that
    (a) the motor applies a first allocation factor when the motor is in a nonsaturated state, and
    (b) the motor applies a second allocation factor when the motor is in at least a partially saturated state.

11. The method of claim 10, wherein the torque current is equal to the flux current multiplied by the allocation factor, as expressed by the following equation:

$$i_{qs}=Ki_{ds}.$$

12. The method of claim 11, wherein the allocation factor is dependent upon the mutual, or magnetizing, inductance of the motor.

13. The method of claim 12, wherein the allocation factor is expressed by the following equation:

$$K = \frac{L_{mNonSaturated}}{L_{mSaturated}}.$$

14. The method of claim 10, further comprising determining the saturation state of the motor based upon motor parameters.

15. A method for selecting the ratio of torque current to flux current for a field oriented induction motor, the method comprising:
    receiving the saturation state of the motor, wherein the saturation state of the motor determined based upon motor parameters; and
    applying an allocation factor to the torque current and the flux current, wherein the allocation factor is dependent upon the saturation state of the motor, such that
    (a) the motor applies a first allocation factor when the motor is in a nonsaturated state, and
    (b) the motor applies a second allocation factor when the motor is in at least a partially saturated state.

16. The method of claim 15, wherein the motor is in a nonsaturated state.

17. The method of claim 16, wherein the torque current is equal to the flux current, as expressed by the following equation:

$$i_{qs}=i_{ds}.$$

18. The method of claim 15, wherein the motor is in a saturated state.

19. The method of claim 18, wherein the torque current is related to the flux current according to following the equation:

$$\frac{i_{qs}}{i_{ds}} = K.$$

20. The method of claim 19, wherein the allocation factor is dependent upon the mutual, or magnetizing, inductance of the motor.

21. The method of claim 20, wherein the allocation factor is expressed by the following equation:

$$K = \frac{L_{mNonSaturated}}{L_{mSaturated}}.$$

22. A field oriented induction motor system, comprising:

a field oriented induction motor having an associated torque current and an associated flux current; and a torque-flux current ratio controller that provides a predetermined current ratio, wherein the predetermined current ratio is defined as the ratio of the torque current to the flux current, and wherein the predetermined current ratio is dependent upon the saturation state of the motor such that
  (a) the motor has a first predetermined current ratio when the motor is in a nonsaturated state, and
  (b) the motor has a second predetermined current ratio when the motor is in at least a partially saturated state.

23. The field oriented induction motor system of claim 22, wherein the first predetermined current ratio is 1:1, and wherein the current ratio is expressed as:

$$\frac{i_{qs}}{i_{ds}} = 1.$$

24. The field oriented induction motor system of claim 22, wherein the second predetermined current ratio is determined according to the equation:

$$\frac{i_{qs}}{i_{ds}} = K,$$

where K is a variable having a value greater than 1.

25. The field oriented induction motor system of claim 24, wherein K is dependent upon the mutual, or magnetizing, inductance of the motor.

26. The field oriented induction motor system of claim 24, wherein K is expressed as:

$$K = \frac{L_{mNonSaturated}}{L_{mSaturated}}.$$

27. The field oriented induction motor system of claim 22, wherein the saturation state of the motor is determined based upon motor parameters.

* * * * *